United States Patent [19]

Matsumoto et al.

[11] 3,991,241
[45] Nov. 9, 1976

[54] LIQUID CRYSTAL DEVICE

[75] Inventors: Shoichi Matsumoto; Nagao Kaneko, both of Yokohama, Japan

[73] Assignee: Tokyo Shibaura Electric Co., Ltd., Kawasaki, Japan

[22] Filed: June 10, 1975

[21] Appl. No.: 585,493

[30] Foreign Application Priority Data
June 13, 1974  Japan ............... 49-66553

[52] U.S. Cl. .................. 428/1; 252/408; 350/160 LC; 427/58
[51] Int. Cl.² .......................... G02F 1/13
[58] Field of Search ............ 428/1; 252/408 LC; 350/160 LC

[56] References Cited
UNITED STATES PATENTS

| | | | |
|---|---|---|---|
| 3,803,050 | 4/1974 | Haas et al. | 252/408 LC |
| 3,814,700 | 6/1974 | Aviram et al. | 252/408 LC |
| 3,854,793 | 12/1974 | Kahn | 428/1 X |

*Primary Examiner*—Ralph S. Kendall
*Attorney, Agent, or Firm*—Carroll F. Palmer

[57] ABSTRACT

A liquid crystal device comprises a substrate having a surface treated with a solution including at least one kind of carboxylatochromium (III) complex, and a liquid crystal in contact with the treated surface of the substrate, in which the treated surface has the property of orientating a liquid crystal molecule in a predetermined direction to the substrate surface.

17 Claims, 5 Drawing Figures

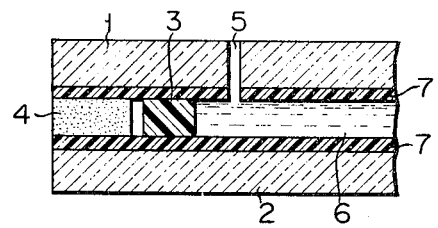
FIG. 1
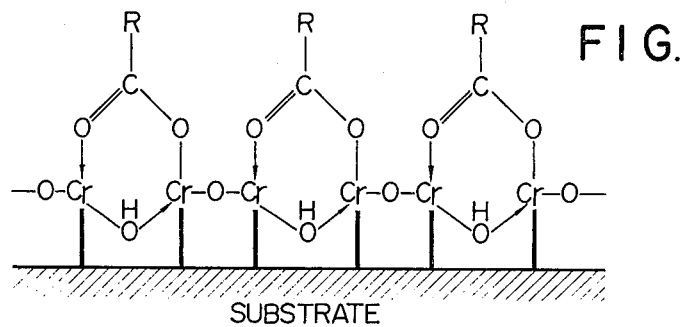
FIG. 2
FIG. 3
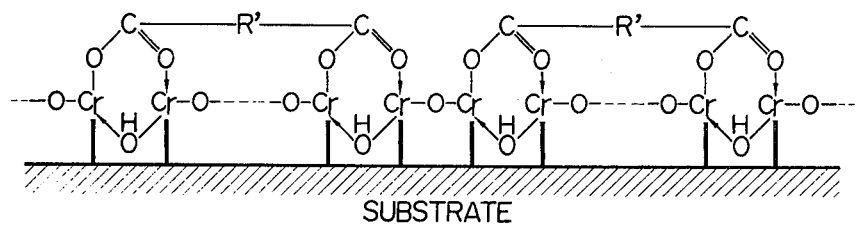
FIG. 4
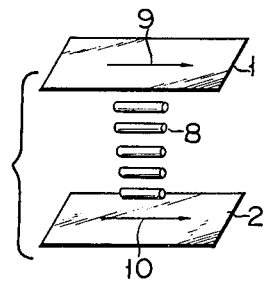
FIG. 5
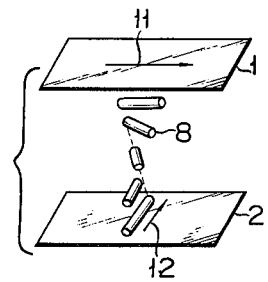

LIQUID CRYSTAL DEVICE

This invention relates to a liquid crystal device useful in various optical devices such as a display device, light modulating device etc. and, in particular, a liquid crystal device having a treated substrate for orientating a liquid crystal in contact with a substrate surface in a predetermined direction to the substrate surface.

Generally, the operation principle of a liquid crystal device for an optical device is based on the fact that, when any external field such as electric field, magnetic field, ultrasonic wave, heat etc. are applied to a liquid crystal layer formed between a pair of parallelly arranged substrates, the liquid crystal is varied in its optical properties. The variation of the optical properties is caused due to the predetermined alignment (initial alignment) of the liquid crystal in the absence of any external field being deformed or disturbed by application of an external field. A liquid crystal device for a so-called electrooptical device, now on a development stage, using electric field as an external field will now be explained below.

DS (Dynamic Scattering) system, DAP (Deformation of vertically Aligned Phases) system, TN (Twisted Nematic) system, PC (Phase Change) system etc. are known as principal display systems for an electrooptical device using a liquid crystal. Under any these systems, predetermined alignment of a liquid crystal in the absence of electric field is required from the standpoint of a principle or performance. With the DS and DAP liquid crystal devices homeotropic or perpendicular alignment-in which a molecular axis (molecular longitudinal axis) of a nematic liquid crystal is orientated in a direction perpendicular to the substrate surface of a liquid crystal cell — is required, the former from the standpoint of improving a display contrast or a light modulation efficiency and, the latter, from the standpoint of a principle. In the TN liquid crystal device, on the other hand, homogeneous or parallel alignment — in which a molecular axis of a nematic liquid crystal is orientated in a direction parallel to a substrate surface — is required from the standpoint of a principle. In the PC liquid crystal device, focal-conic alignment — in which a helical axis of a cholesteric liquid crystal is orientated in a direction parallel to a substrate surface — is necessary.

In the manufacture of any liquid crystal device, the technique of orientating a molecular axis of a liquid crystal in a predetermined direction to a substrate surface is very important. Several liquid crystal orientation methods have been proposed to date. As the representative methods are known, for example, a method for treating a substrate surface with acid or alkali, method for rubbing or polishing a substrate surface by a cotton cloth, abrasive agnet etc., and method for treating a substrate surface with a certain kind of surface active agent or organic silane compound. These methods, however, suffer certain defects from the practical viewpoint. That is, any acid or alkali treatment can not be applied to a substrate surface on which a metal evaporated film as an electrode is formed. In the rubbing or polishing method it is very difficult to realize uniform orientation over the whole surface of a substrate surface in contact with a liquid crystal. In the treatment with the surface active agent or organic silane compound it is mostly impossible to attain stable orientation featured by its permanency, durability and reliability.

One object of this invention is to provide a liquid crystal device having a treated substrate capable of orientating a liquid crystal molecule uniformly, in a predetermined direction, over a whole substrate surface in contact with a liquid crystal.

Another object of this invention is to provide a liquid crystal device having a treated substrate capable of maintaining the orientation, in a predetermined direction, or a liquid crystal molecule for a longer period of time.

Another object of this invention is to provide a liquid crystal device having a treated substrate capable of orientating a liquid crystal molecule with respect to the surface of a glass substrate, metal substrate, tin- or indium-oxide coated glass substrate or Al-, Cr- or Au-evaporated glass substrate.

Another object of this invention is to provide a liquid crystal device having a treated substrate capable of attaining a greater bonding strength between a pair of oppositely arranged substrates with a liquid crystal in between.

Another object of this invention is to provide a liquid crystal device excellent in its moisture proofness.

These and other objects of this invention can be attained by a liquid crystal device comprising a substrate having a surface treated with a solution including at least one kind of carboxylatochromium (III) complex and a liquid crystal in contact with the treated surface of the substrate.

This invention can be more fully understood from the following detailed description when taken in conjunction with the accompanying drawings, in which:

FIG. 1 is a cross-sectional view showing one embodiment of a liquid crystal device according to this invention;

FIG. 2 shows the schematic state in which a substrate surface is treated with monocarboxylatochromium (III) complex;

FIG. 3 shows the schematic state in which a substrate surface is treated with dicarboxylatochromium (III) complex;

FIG. 4 is a view showing homogeneous alignment of a liquid crystal molecule; and FIG. 5 is a view showing twist alignment of a liquid crystal molecule.

In FIG. 1 is shown a cross-sectional view of a liquid crystal device according to this invention. A pair of substrates 1, 2 at least one of which is transparent are parallelly disposed. Between the substrates 1 and 2 a spacer 3 is disposed so that the substrates 1 and 2 are held at a predetermined interval. The outer peripheral portions of the substrates are bonded together by an adhesive 4 and a liquid crystal is introduced from an inlet hole 5 in one substrate 1. On the liquid crystal side of each substrate an orientation imparting layer 7 is formed by subjecting the substrate to a coupling treatment by carboxylatochromium (III) complex. The orientation imparting layer 7 imparts homeotropic alignment to a nematic liquid crystal, focal-conic or homeotropic alignment to a cholesteric liquid crystal, and homeotropic alignment to a smectic liquid crystal. The surface of the orientation imparting layer 7, mostly when polished in a predetermined direction, provides homogeneous alignment to the nematic, smectic, . . . liquid crystals. In this case, use is made as carboxylatochromium (III) complex of dicarboxylatochromium (III) complex (chromium (III) complex of dicarboxylic acid). The liquid crystal device, according to this invention, in which the liquid crystal is orientated is useful as the DS, DAP, PC, TN . . . liquid crystals.

Carboxylatochromium (III) complex as used in this invention is carboxylatochromium (III) complex having a general formula:

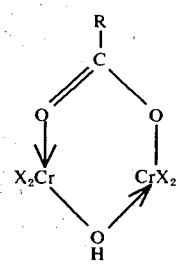

in which

X: anion (generally, nitride ion ($NO_3^-$) or halide ion, typically chloride ion)

R: saturated or unsaturated aliphatic hydrocarbon group, saturated or unsaturated cyclic hydrocarbon group, group formed by replacing the whole or part of hydrogens in the above-mentioned hydrocarbon groups by fluorine, and so on.

As such chromium (III) complex the following materials may be listed by way of example. Chromium (III) complex of saturated carboxylic acid such as arachic acid, stearic acid, palmitic acid, myristic acid, lauric acid, caproic acid, butyric acid etc., chromium (III) complex of unsaturated carboxylic acid such as oleic acid, metharcrylic acid etc., charomium (III) complex of cyclic carboxylic acid such as abietic acid, dextropimaric acid, benzoic acid, p-hydroxybenzoic acid, p-aminobenzoic acid, p-nitrobenzoic acid etc., and chromium (III) complex of carboxylic acid in which the whole or part of hydrogens in pentanoic acid, hexanoic acid, heptanoic acid, octanoic acid, nonanoic acid or decanoic acid is replaced by fluorine. These materials should not be taken as in a limitative way. Two or more carboxylatochromium (III) complexes may be mixed as required.

Carboxylatochromium (III) complex as used in this invention may be dicarboxylatochromium (III) complex having a general formula:

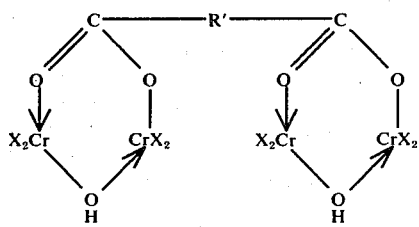

in which R' denotes saturated on unsaturated hydrocarbon chain, or the hydrocarbon chain in which hydrogen atom is replaced by methyl group, hydroxyl group, amino group, or the hydrocarbon chain having carbonyl group or ether group etc.

In this case, homogeneous alignment necessary for the TN liquid crystal device etc. can be provided, mostly by rubbing the surface of the substrate, after treatment, in a predetermined direction using a cotton cloth etc.

As dicarboxylatochromium (III) complex capable of providing homogeneous alignment, use is made of, for example, chromium (III) complex of dicarboxylic acid such as succinic acid, glutaric acid, adipic acid, suberic acid, azelaic acid, sebacic acid, brasilic acid, dodecanedicarboxylic acid, maleic acid, glutaconic acid, methylsuccinic acid, malic acid, L-aspartic acid, L-glutamic acid, tartaric acid, mucic acid, hydrochelidonic acid, diglycolic acid etc. These materials should not be taken as in a restrictive way. Two or more materials may be mixed as required.

A uniform liquid crystal orientation excellent in permanency, durability and reliability is obtained by subjecting the substrate surface in contact with a liquid crystal to treatment by the above-mentioned carboxylatochromium (III) complex. The reason for this is considered as follows. That is, as shown in FIG. 2, monocarboxylatochromium (III) complex is strongly chemically bonded through chromium (Cr) to the substrate surface and also the complexes themselves are cross-linked (polymerized) through oxygen atom (O). With the above-mentioned complex layer so formed on the substrate surface, hydrophobic hydrocarbon group or fluorine contained hydrocarbon group represented by R projects on the liquid crystal side as shown in FIG. 2. For this reason it is considered that homeotropic alignment is given to the nematic, smectic and large-pitch cholesteric liquid crystals and focalconic alignment to the cholesteric liquid crystal. With chromium (III) complex of monocarboxylic acid such as benzoic acid, p-hydroxybenzoic acid, p-aminobenzoic acid, p-nitrobenzoic acid etc., on the other hand, homogeneous alignment of a liquid crystal is provided.

Where dicarboxylatochromium (III) complex is used, as shown in FIG. 3 the complex is strongly chemically bonded through chromium (Cr) to the substrate surface and, at the same time, the complexes are cross-linked (polymerized) together through oxygen atom (O) with the result that hydrocarbon chain represented by R' is arranged in parallel to the substrate surface. Assisted by this parallel arrangement of the hydrocarbon chain, a liquid crystal molecule is orientated parallelly with respect to the substrate surface. By rubbing the substrate surface along a predetermined direction using a cotton cloth a directional orientation can be provided to the liquid crystal. That is, as shown in FIG. 4, each inner surface of oppositely arranged substrates 1 and 2 in a liquid crystal device is subjected to treatment by dicarboxylatochromium (III) complex and then rubbed in the same direction as indicated by arrows 9 and 10 in FIG. 4. This permits a liquid crystal molecule 8 to be homogeneously orientated in one direction. If the surfaces of the oppositely arranged substrates are rubbed in a direction perpendicular to each other as indicated by arrows 11 and 12 in FIG. 5, twist alignment as shown in FIG. 5 can be obtained.

Where the oppositely arranged substrates in the liquid crystal device are bonded at their outer peripheral surface using a plastics adhesive material made of, for example, nylon, polyethylene, epoxy etc., an intersubstrate bonding strength is markedly increased, if use is made of the substrate subjected to treatment by carboxylatochromium (III) complex according to this invention. As a result, the moisture-proofness of the liquid crystal device is prominently increased to advantage. For example, a mixture of methacrylatochromium (III) complex and chromium (III) complex of fluorocarboxylic acid, of methacrylatochromium (III) complex and chromium (III) complex of monocarboxylic acid other than methacrylic acid, or metharcylatochromium (III) ocmplex and chromium (III) complex of dicarboxylic acid is very effective for greatly increasing a bonding strength between the oppositely arranged substrates. Where the mixed weight ratio of methacrylatochromium (III) complex to chromium (III) complex of fluorocarboxylic acid is particularly 9:1 to 1:5, the most desirable intersubstrate bonding strength can be obtained.

The substrate surface is subjected to a coupling (bonding) treatment by chromium (III) complex of carboxylic acid as will be explained below. That is, a concentrated solution of chromium (III) complex of carboxylic acid is added to water, a suitable organic solvent or a mixture thereof to give a 0.01 to 10 weight percent solution as a treating solution, and the solution is coated on the substrate by a known method such as an immersion method, spray method, brushing method, spinner method, pickup method; roll method etc., followed by drying.

As a result, coupling between the substrate and chromium (III) complex of carboxylic acid, as well as the self-crosslinking of chromium (III) complex of carboxylic acid, can be attained. Therefore, a uniform orientation imparting layer 7 can be very easily formed. The result remains unchanged even where alkaline material such as ammonia, caustic soda, hexamethylenetetramine, urea etc. is added, as required, to the treating solution to control the pH. A coupling and selfcrosslinking reaction can be satisfactorily obtained even when the coated solution is subjected only to drying at room temperature. An orientation imparting layer 7 can be formed for a shorter time period if the coated solution is dried, as required, by application of heating.

To attain an optimum substrate-treating effect of chromium (III) complex of carboxylic acid, it is desirable to wash the treated substrate with water or a suitable organic solvent. The washing step, if impracticable from the standpoint of the substrate treatment processing or the design consideration of the liquid crystal device, may be omitted.

Any liquid crystal may be used in this invention. As a nematic liquid crystal, for example, the following material can be listed:

p-[N-(p'-methoxybenzylidene)amino]-n-butylbenzene —hereinafter referred to as MBBA
p-[N-(p'-ethoxybenzylidene)amino]-butylbenzene —hereinafter referred to as EBBA
p-[N-(p'-methoxybenzylidene)amino]phenyl butyrate n-butyl-p-(p'-ethoxyphenoxycarbonyl)phenylcarbonate p-methoxy-p'-n-butylazoxybenzene
p-ethoxy-p'-n-butylazobenzene
p-[N-(p'-methoxybenzylidene)amino]benzonitrile —hereinafter referred to as BBCA
p-[N-(p'-hexylbenzylidene)amino]benzonitrile —hereinafter referred to as HBCA Listed as cholesteric liquid crystal are:
Cholesteryl chloride
Cholesteryl nonanoate—hereinafter referred to as CN
Cholesteryl oleate
Cholesteryl-2-ethylhexanoate
Cholesteryl benzoate
Cholesteryl acetate Listed as a smectic liquid crystal are:
N-(p-cyanobenzylidene)-p'-n-octylaniline —hereinafter referred to as CBOA
ethyl-p-azoxybenzoate
ammoniumoleate Two or more materials may be mixed as a liquid crystal.

Practical examples of the liquid crystal device according to this invention will now be explained below.

EXAMPLE 1

A pair of oppositely arranged substrates of 40 mm in height × 80 mm in width × 1.5 mm in thickness were parallelly sealed, with a liquid crystal contained therebetween to obtain a liquid crystal device. The following substrates were used singly or in combination so as to effect comparison.

1. A glass substrate having a (non-coated) surface in contact with a liquid crystal.
2. A glass substrate having a surface, in contact with a liquid crystal, coated with a transparent tin-oxide electroconductive material so as to act as an electrode plate.
3. A glass substrate having a surface, in contact with a liquid crystal, Al-evaporated so as to act as a metal reflective electrode plate.
4. A chromium metal plate having a mirror-polished surface in contact with a liquid crystal.

10 weight %, 1 weight % and 0.1 weight % treating solutions were prepared by adding water to concentrated chromium (III) complex solution of myristic acid, and the substrates were immersed for 10 minutes in the above-mentioned three treating solutions. After immersion coating, the substrates were dried by heating for one hour in an atmosphere of 150° C to effect coupling (bonding) of chromium (III) complex of myristic acid to the substrates as well as self-crosslinking of chromium (III) complex of myristic acid.

The so coated substrates, after fully washed with running water, were paired into four combinations: glass plate-glass plate; tin oxide coated glass substrate-tin oxide coated glass substrate; tin oxide coated glass substrate-aluminium evaporated glass substrate; tin oxide coated glass substrate-chromium metal plate. The paired substrates were parallelly arranged with a 12μ polyester film (commercially available under a trade name "Mylar") spacer being disposed therebetween to provide a space for introducing a liquid crystal. With a nylon adhesive sheet further disposed in place between the paired substrates, the paired substrates were face-bonded, by heating for 10 minutes in an atmosphere of 140° C while applying uniform pressure, to obtain a liquid crystal structure (cell). A liquid crystal was introduced through an inlet hole into the structure and the inlet was closed to complete a liquid crystal device. As the liquid crystal use was made of representative ones of the abovementioned nematic, smectic and cholesteric liquid crystals and of liquid crystals obtained by mixing together the abovementioned representative liquid crystals.

Upon observing the alignment of the liquid crystal, the so obtained liquid crystal devices showed excellent orientation (alignment) as shown in Table 1.

The observation of the alignment was done between cross nicols under a polarizing microscope. That is, the homeotropic orientation (alignment) was verified through an extinction phenomenon under orthoscope and at the isogyres (a black cross) under conoscope.

With respect to focal-conic orientation, a texture characteristic of the focal-conic alignment was observed.

Two kinds of liquid crystal structures (cells) were prepared using the combination of the tin-oxide coated glass substrate and tin-oxide coated glass substrate and of the tin-oxide coated glass substrate and aluminum evaporated glass substrate, the substrate of each combination being treated with the above-mentioned 1 weight % solution. A nematic liquid crystal consisting of a mixture of (MBBA) ½ and (EBBA) ½ was introduced into these liquid crystal structures to obtain two liquid crystal devices, and DS and DAP display operation tests of these liquid crystal devices were conducted. Even after the lapse of 13000 hours under continuous electric power supply, an excellent display characteristic was maintained and the homeotropic orientation (initial alignment) of the liquid crystal was not disturbed.

tropic alignment featured by its permanency and endurance and were proved excellent.

EXAMPLE 3

Liquid crystal device structures (cells) were prepared using large-sized substrates of 80 mm in height and 150 mm in width and 3 mm in thickness. In this Example, the following three substrate combinations were used: glass substrate-glass substrate; tin-oxide coated glass substrate-tin-oxide coated glass substrate; tin-oxide coated glass substrate-aluminium evaporated glass substrate. The paired substrates were hermetically sealed by solder glass with a 20μ spacer disposed therebetween.

In order to orientation-treat the inner surface of the liquid crystal device structure, 1 weight % and 0.1 weight % treating solutions prepared by diluting a concentrated solution of chromium (III) complex of per- Table 1

| Liquid crystal and alignment | Treating solution concentration (weight %) | Glass substrate and glass substrate | Tin-oxide coated glass substrate and tin-oxide coated glass substrate | Tin-oxide coated glass substrate and aluminium evaporated glass substrate | Tin-oxide coated glass substrate and chrominum metal plate |
|---|---|---|---|---|---|
| Nematic liquid crystal (MBBA) homeotropic alignment | 10 | ◎ | ◎ | ◎ | ◎ |
|  | 1 | ◎ | ◎ | ◎ | ◎ |
|  | 0.1 | ◎ | ◎ | ◎ | ◎ |
| Mixed nematic liquid crystal (1/2 MBBA and 1/2 EBBA) homeotropic alignment | 10 | ◎ | ◎ | ◎ | ◎ |
|  | 1 | ◎ | ◎ | ◎ | ◎ |
|  | 0.1 | ◎ | ◎ | ◎ | ◎ |
| Mixed cholesteric liquid crystal (1/5 CN and 4/5 HBCA) focal-conic alignment | 10 | ◎ | ○ | ○ | ○ |
|  | 1 | ◎ | ◎ | ◎ | ◎ |
|  | 0.1 | ◎ | ◎ | ◎ | ○ |
| Smectic liquid crystal (CBOA) homeotropic alignment | 10 | ○ | ◎ | ○ | ◎ |
|  | 1 | ◎ | ◎ | ◎ | ◎ |
|  | 0.1 | ◎ | ◎ | ◎ | ○ | mark ◎ denotes the case where alignment is uniformly effected over the whole region of the substrate
mark ○ denotes the case where alignment is very slightly disturbed as compared with the case marked ◎.

EXAMPLE 2

The various substrates used in Example 1 were coated, by a spray method, with a treating solution prepared by diluting a concentrated solution of chromium (III) complex of stearic acid with water to obtain 1 weight % and 0.05 weight % solutions and then adding an N/10 ammonia water as a neutralizing agent to these solutions to obtain a pH of about 6. The coated substrates were dried by heating for 10 minutes in an atmosphere of 80° C and, after allowed to cool, washed with acetone and water to obtain liquid crystal structures (cells) as in Example 1. A nematic liquid crystal (MBBA) and mixed nematic liquid crystal (50 weight % MBBA and 50 weight % EBBA) were introduced into these liquid crystal device structures to obtain sealed liquid crystal devices. These liquid crystal devices exhibited, upon observation, uniform homeofluorononanoic acid with an equivalent mixed solvent of water and ethanol were respectively introduced through a suitably located inlet hole into the liquid crystal device structure and, after allowed to stand for 10 minutes, discharged out from the liquid crystal device structure. Then, a dry air was passed through the inlet hole to fully dry the inner surface of the structure and the structure was allowed to stand a whole day and night at room temperature, resulting in coupling (bonding) between the substrate and the above-mentioned chromium (III) complex as well as in self-crosslinking (polymerizing) of the chromium (III) complex.

The four kinds of liquid crystal as used in Example 1 were respectively introduced through the inlet hole into the so obtained device structures to obtain sealed liquid crystal device. The alignment of the liquid crystal in the device structure was observed by the same evaluation method as in Example 1, the results of which are shown in Table 2.

Table 2

| Liquid crystal and alignment | Treating solution concentration (weight %) | Substrate combination | | |
|---|---|---|---|---|
| | | Glass substrate and glass substrate | Tin-oxide coated glass substrate and tin-oxide coated glass substrate | Tin-oxide coated glass substrate and aluminum evaporated glass substrate |
| Nematic liquid crystal (MBBA) homeotropic alignment | 1 | ◎ | ◎ | ◎ |
| | 0.1 | ◎ | ◎ | ◎ |
| Mixed nematic liquid crystal (1/2 MBBA and 1/2 EBBA) homeotropic alignment | 1 | ◯ | ◎ | ◎ |
| | 0.1 | ◯ | ◯ | ◎ |
| Mixed cholesteric liquid crystal (1/5 CN and 4/5 HBCA) focal-conic alignment | 1 | ◯ | ◯ | ◎ |
| | 0.1 | ◎ | ◯ | ○ |
| Smectic liquid crystal (CBOA) homeotropic alignment | 1 | ◎ | ◎ | ◎ |
| | 0.1 | ◎ | ◯ | ○ |

As in Example 1, liquid crystal devices — using a combination of a tin-oxide coated glass substrate and tin-oxide coated glass substrate and of a tin-oxide coated glass substrate and aluminium evaporated glass substrate — were formed by introducing a mixed nematic liquid crystal (½ MBBA and ½ EBBA) into the liquid crystal device structures whose substrates were treated, for example, with the 0.1 weight % treating solution. The DS and DAP display operation tests of these liquid crystal devices were conducted. Even after the lapse of 13000 hours an excellent display characteristic was maintained and the homeotropic orientation of the sealed liquid crystal was not disturbed.

measured in terms of solids content and diluting the mixed solution with water to obtain a 1 weight % solution. As a result, liquid crystal device structures similar to those in Example 1 were prepared and the four kinds of liquid crystal as shown in Example 1 were respectively introduced into the structures to obtain liquid crystal devices. The orientation (alignment) of the liquid crystal, as well as a bond performance between the substrates in the liquid crystal device, was observed, the results of which are shown in Table 3.

Table 3

| Liquid crystal and alignment | A:B as measured in terms of solids content | Substrate combination | | | |
|---|---|---|---|---|---|
| | | Glass substrate and glass substrate | Tin-oxide coated glass substrate and tin-oxide coated glass substrate | Tin-oxide coated glass substrate and aluminium evaporated glass substrate | Tin-oxide coated glass substrate and chromium metal plate |
| Nematic liquid crystal (MBBA) homeotropic alignment | 3:1 | ◎++ | ◎+ | ◯+ | ◎+ |
| | 1:1 | ◎++ | ◎++ | ◎++ | ◎++ |
| | 1:3 | ◎++ | ◯++ | ◯++ | ◯++ |
| Mixed nematic liquid crystal (1/2 MBBA and 1/2 EBBA) homeotropic alignment | 3:1 | ◎++ | ◎++ | ◎+ | ◯+ |
| | 1:1 | ◎++ | ◎++ | ◎++ | ◎++ |
| | 1:3 | ◎++ | ◎++ | ◎++ | ◯++ |
| Mixed cholesteric liquid crystal (1/5 CN and 4/5 HBCA) focal-conic alignment | 3:1 | ◎++ | ◎++ | ◎+ | ◎+ |
| | 1:1 | ◎++ | ◎++ | ◎++ | ◯++ |
| | 1:3 | ◯++ | ◯++ | ◯++ | ◯++ |
| Smectic liquid crystal (CBOA) homeotropic alignment | 3:1 | ◯+ | ◯+ | ◯++ | ◯+ |
| | 1:1 | ++ | ◯++ | ◯++ | ◯++ |
| | 1:3 | ◯++ | ◯++ | ◯++ | ◯++ |

EXAMPLE 4

An orientation treatment was effected on the various substrates shown in Example 1 using a treating solution prepared by mixing a concentrated chromium (III) complex solution A of perfluorononanoic acid and a concentrated chromium (III) complex solution B of methacrylic acid at an A:B ratio of 1:3, 1:1 and 3:1 as In Table 3, a mark ◎ denotes the case where alignment was uniformly effected over the whole area of the liquid crystal device and a mark ◯ denotes the case where alignment was very slightly locally disturbed. A mark ++ shows the case where as a result of pull tests an excellent bonding performance was exhibited and mark + shows the case where as a result of pull tests a slight debonding was locally effected.

As will be evident from Table 3, uniform orientation featured by its permanency and durability was observed over the whole surface of the liquid crystal device.

Furthermore, excellent bonding was obtained between the substrates due to the use of a plastics adhesive sheet. Particularly, it was found that bonding is prominently improved as chromium (III) complex of methacrylic acid is increased in its mixed ratio.

DS and DAP display operation tests of the liquid crystal devices — a combination of a tin-oxide coated glass substrate and tin-oxide coated glass substrate and of a tin-oxide coated glass substrate and aluminium evaporated glass substrate — were conducted under continuous electric power supply. Even after the lapse of 13000 hours an excellent display characteristic was maintained and homeotropic orientation of the sealed liquid crystal was not disturbed.

The liquid crystal device also represented much improved moisture-proofness and, under continuous electric power supply in a high humidity environment (90% RH), maintained an excellent display performance without suffering any adverse influence.

EXAMPLE 5

Various substrates as used in Example 1 were immersed for 10 minutes in a 1 weight % solution (a mixed solvent of ethanol and water in equivalent amount) of chromium (III) complex of benzoic acid, p-hydroxybenzoic acid, p-aminobenzoic acid or dicarboxylic acid such as adipic acid, sebacic acid, brasilic acid, glutaconic acid, malic acid, L-glutamic acid, tartaric acid, mucic acid, hydrochelidonic acid or diglycolic acid. After immersion coating, the substrates were dried for 30 minutes in an atmosphere of 150° C to effect self-crosslinking of chromium (III) complex as well as coupling between the substrate and the above-mentioned chromium (III) complex. The substrates, after washed by running water and dried, were lightly rubbed two to three times in a predetermined direction using a cotton cloth (gauze).

The so obtained substrates were so arranged as to make the rubbing direction of one substrate perpendicular to that of the other substrate and, as a result, liquid crystal device structures were obtained. A mixed liquid crystal of 80 weight % MBBA and 20 weight % BBCA was introduced into the liquid crystal device structures to complete liquid crystal devices.

The liquid crystal device exhibited excellent twisted alignment upon observing under a polarizing microscope the uniformity of a color tone and the light and dark fields of view between cross nicol and between parallel nicol.

The TN display operation tests of the liquid crystal device were conducted and, even after the lapse of 9000 hours under continuous application of AC 5V (50 Hz, sine-wave), the liquid crystal devices maintained excellent display characteristic. Furthermore, the twisted alignment was not disturbed, thereby showing excellent permanency, durability and stability.

Although the paired substrates are oppositely arranged in the above-mentioned embodiments, this invention is not restricted thereto. For example, use may be made of a single substrate in which an orientation imparting layer is formed on the surface of the single substrate and a liquid crystal layer is formed on the orientation imparting layer so formed. It is not necessary that the above-mentioned orientation imparting layer be formed directly on the substrate. The orientation imparting layer may be formed, for example, on a metal foil and the resultant metal foil be bonded to the substrate.

What we claim is:

1. A liquid crystal device comprising a substrate whose surface is provided with a layer of at least one chromium complex selected from the group consisting of monocarboxylatochromium (III) complex and dicarboxylatochromium (III) complex, and a liquid crystal in contact with the chromium complex layer of the substrate, in which said layer has the property of orientating a liquid crystal molecule in a predetermined direction to the substrate surface.

2. A liquid crystal device according to claim 1 in which said monocarboxylatochromium (III) complex has a general formula:

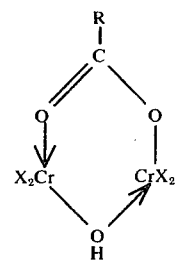

where R denotes saturated or unsaturated aliphatic hydrocarbon group, or saturated or unsaturated cyclic hydrocarbon group, and X is anion.

3. A liquid crystal device according to claim 2 in which said anion represented by X is a nitrate ion or halide ion.

4. A liquid crystal device according to claim 2 in which all or part of hydrogens in said hydrocarbon group represented by R is replaced by fluorine.

5. A liquid crystal device according to claim 1 in which said dicarboxylatochromium (III) complex has a general formula:

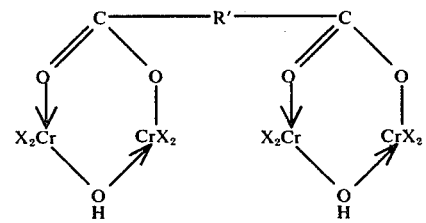

where R' denotes saturated or unsaturated hydrocarbon chain; hydrocarbon chain formed by replacing all or part of hydrogens in said hydrocarbon chain by at least one kind of methyl group, hydroxyl group and amino group; or saturated or unsaturated hydrocarbon chain havng carbonyl group or ether group; and X denotes anion.

6. A liquid crystal device according to claim 5 in which said anion represented by X is a nitrate ion or halide ion.

7. A liquid crystal device according to claim 2 in which said complex is selected from the group consisting of chromium (III) complex of arachic acid, stearic acid, parmitic acid, myristic acid, lauric acid, caproic acid, butyric acid, oleic acid, methacrylic acid, abietic acid, dextropimaric acid, benzoic acid, p-hydroxybenzoic acid, p-aminobenzoic acid and p-nitrobenzoic acid, and a mixture of two or more complexes.

8. A liquid crystal device according to claim 4 in which said complex is selected from the group consisting of chromium (III) complex of carboxylic acid formed by replacing with fluorine the whole or part of hydrogens in pentanoic acid, hexanoic acid, heptanoic acid, octanoic acid, nonanoic acid and decanoic acid, and a mixture of two or more complexes.

9. A liquid crystal device according to claim 5 in which said complex is selected from the group consisting of chromium (III) complex of succinic acid, glutaric acid, adipic acid, suberic acid, azelaic acid, sebacic acid, brasilic acid, dodecanedicarboxylic acid, maleic acid, glutaconic acid, methylsuccinic acid, malic acid, L-aspartic acid, L-glutamic acid, tartaric acid, mucic acid, hydrochelidonic acid and diglycolic acid and a mixture of two or more complexes.

10. A liquid crystal device according to claim 1 in which said complex is a mixture of monocarboxylatochromium (III) complex having hydrocarbon group and monocarboxylatochromium (III) complex in which hydrogen in hydrocarbon group is replaced by fluorine.

11. A liquid crystal device according to claim 10 in which said mixture consists of methacrylatochromium (III) complex and fluorocarboxylatochromium (III) complex.

12. A liquid crystal device according to claim 11 in which a mixed weight ratio of said methacrylatochromium (III) complex to fluorocarboxylatochromium (III) complex is 9:1 to 1:5.

13. A liquid crystal device according to claim 10 in which said complex is a mixture of chromium (III) complex of metharcylic acid and chromium (III) complex of carboxylic acid other than methacrylic acid.

14. A liquid crystal device according to claim 11 in which said chromium complex is chemically bonded to the substrate surface and is cross-linked.

15. A liquid crystal device according to claim 14 in which said layer is formed by bringing a solution in contact with the substrate surface followed by drying, said solution comprising said complex and a solvent selected from the group consisting of water, organic solvent and mixtures thereof.

16. A liquid crystal device according to claim 15 in which said solution includes alkali material.

17. A liquid crystal device according to claim 15 in which the concentration of said complex solution is 0.01 to 10% by weight.

* * * * *